No. 616,226. Patented Dec. 20, 1898.
W. DE MORGAN.
VELOCIPEDE.
(Application filed Dec. 20, 1897.)
(No Model.)
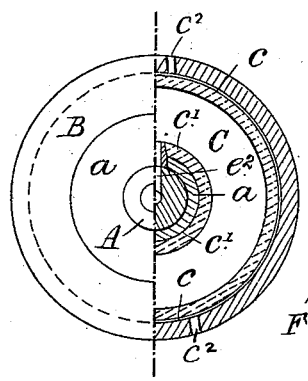
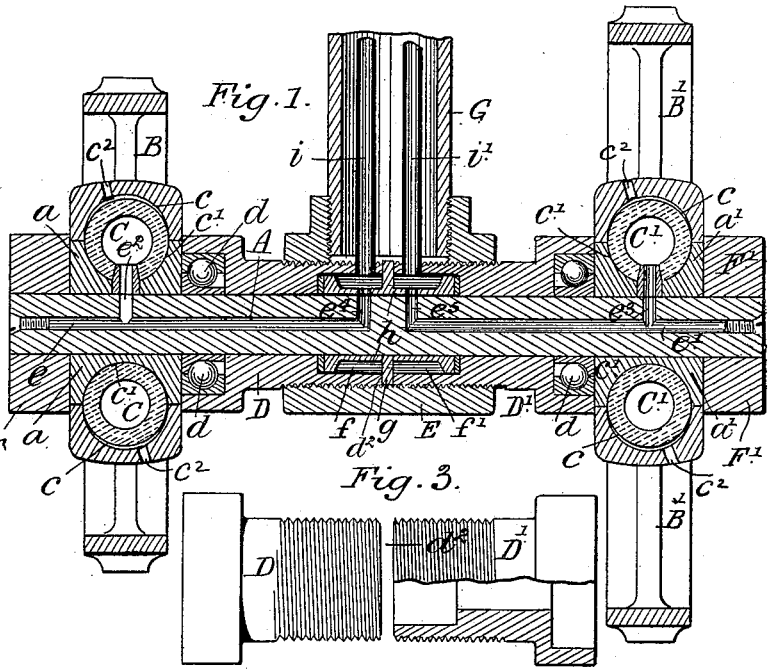
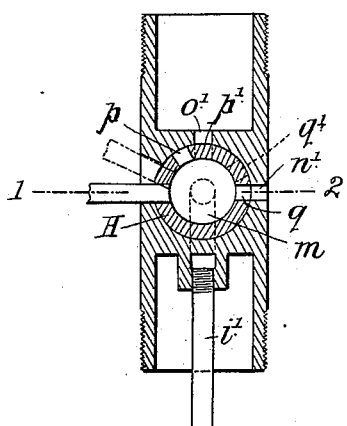
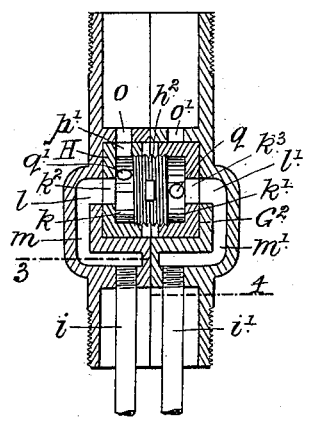
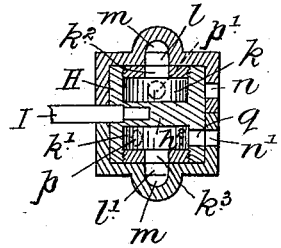
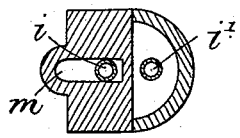
Witnesses:
Inventor.
William De Morgan
by his attorneys.
THE NORRIS PETERS CO., PHOTO-LITHO., WASHINGTON, D. C.

UNITED STATES PATENT OFFICE.

WILLIAM DE MORGAN, OF LONDON, ENGLAND, ASSIGNOR OF ONE-HALF TO WANDA IRENE C. STRANGE, OF FLORENCE, ITALY.

VELOCIPEDE.

SPECIFICATION forming part of Letters Patent No. 616,226, dated December 20, 1898.

Application filed December 20, 1897. Serial No. 662,554. (No model.)

*To all whom it may concern:*

Be it known that I, WILLIAM DE MORGAN, potter, a subject of the Queen of Great Britain and Ireland, residing at The Vale, Kings road, Chelsea, in the city of London, England, but at present temporarily residing at 15 Lungo Il Mugnone, Florence, in the Kingdom of Italy, have invented certain Improvements in or Connected with Velocipedes, (for which I have obtained a patent in Great Britain, No. 13,609, dated June 19, 1896,) of which the following is a specification.

My invention has for its principal object to provide simple and convenient apparatus or means whereby compressed air is employed for varying the power of the driving-gear of velocipedes, but is applicable also for operating the brakes, inflating the pneumatic tires and saddles, and for sounding whistles or other audible signals.

I will describe my invention as applied to a bicycle, from which its application to vehicles of a like kind will also be understood. I utilize the hollow frame of the bicycle or part of the said frame as a container of compressed air and provide in a convenient part thereof a cylinder or valve-box containing two chambers capable of being respectively connected by two pipes or passages (preferably within the hollow frame) with two chambers provided in the bearing in which the crank shaft or axle is mounted. On the crank shaft or axle and adjacent to the pedals are loosely mounted two chain-wheels of different diameters geared by chains to two other chain-wheels, also of different diameters, mounted on the axle of the rear or main driving-wheel of the bicycle, thus providing a double driving-gear of which the speeds may be varied to meet particular requirements. In the interior of the hub of each of the chain-wheels on the crank-axle is an annular flexible or elastic tube or chamber, which in its normal condition fits easily within the hub of the wheel, so as to allow of the free rotation of the wheel on the axle. Each such tube or chamber is in communication through a passage in the crank-axle with one of the chambers in the bearing of the said axle. The valve is provided with a handle by means of which the said valve may be partially rotated in the shell or casing, passages being provided in the said shell or casing and also in the valve so arranged that by moving the handle in one direction or the other passages in the shell of the valve and in one of the chambers therein are made to coincide, so as to admit compressed air from the hollow frame into the said chamber and thence into the corresponding chamber in the crank-axle bearing, whence it passes through one of the longitudinal passages in the said axle and through branches therefrom into the flexible tube or chamber in the hub of the corresponding chain-wheel mounted on the said axle. The flexible tube or chamber is thus expanded and caused to so engage the hub of the wheel that the wheel rotates with the axle and transmits motion through its gearing-chain to the chain-wheel on the axle of the driving-wheel of the bicycle, which chain-wheel may in order to minimize friction be connected to the axle of the driving-wheel by a pawl-and-ratchet or equivalent device, which when the chain-wheel is rotated will drive the axle, but which when the axle is rotated will yield and allow the axle to turn in the hub of the wheel without imparting rotation to the said wheel, or the said chain-wheel may be attached to the axle, as usual.

When the valve is moved to admit compressed air into the flexible tube or chamber of one of the chain-wheels on the crank-axle, passages are opened which will allow air to escape from the flexible tube or chamber in the hub of the other chain-wheel on the said crank-axle. It will be readily understood that according to the direction in which the valve is moved compressed air can be directed into the flexible tube or chamber of either the large or the smaller chain-wheel on the crank-axle, and thereby drive the axle by either the large wheel or the smaller wheel and so increase or reduce the power and speed as required. Tubes may be connected to the hollow frame for the purpose of conducting the compressed air therefrom for inflating the pneumatic tires and for operating air-brakes, also for sounding a whistle or other audible signal, the said tube or tubes being provided with a valve or valves which may be operated by a simple pressure. The compressed air may also be utilized to promote the elasticity of the seat either by pistons or the inflation of a cushion or otherwise. By substituting a pendulum for the valve-actuating handle hereinbefore described the valve may be caused to act automatically to vary the power of the driving-gear as the gradient of the road varies.

Figure 1 of the accompanying drawings is a longitudinal section of the crank-axle of a bicycle, the bottom bracket and bearings and parts in connection therewith constructed and arranged according to my invention. Fig. 2 shows partly in elevation and partly in section in a plane at right angles to the axis of the crank-axle the hub of one of the chain-wheels mounted on the said crank-axle. Fig. 3 is a side elevation of the bush or sleeve secured to the bottom bracket, in which sleeve the crank-axle turns. Figs. 4 and 5 are longitudinal sections at right angles to each other of the valve and valve-box for directing the compressed air in the direction required. Fig. 6 is a transverse section on the line 1 2, Fig. 4. Fig. 7 is a transverse section on the line 3 4, Fig. 5; and Fig. 8 shows in transverse section a modified construction of the valve.

The crank-axle A of the machine is provided with two collars $a\ a'$, upon which are loosely mounted two chain-wheels B B', one of which wheels, B', is of greater diameter than the other wheel, B. The interior of the hub of each of these wheels has a semicircular or semi-elliptical recess $c$ formed therein, and in the periphery of each of the collars is formed a similar recess $c'$, so that when the wheel is in position on the collar a circular or approximately circular annular chamber is formed to contain an expansible tubular ring C C', of india-rubber or equivalent material, a space being left between the said tubular ring and the recess in the hub of the wheel, to which space air has access through suitable openings $c^2$, provided in the hub for the purpose. The axle A and collars $a\ a'$, together with the tubular rings C C', are normally free to turn in the hubs of the wheels B B'. The axle A is mounted so as to rotate in a two-part bush or sleeve D D', screwed or otherwise secured on the bottom bracket E, ball-bearings $d$ being provided between the axle and the bush or sleeve D D' to reduce friction. On the outer ends of the axle A are keyed the cranks F F', between which cranks and the ends of the bush or sleeve D D' the hubs of the chain-wheels B B' are situated and by which they are retained in position.

In the axle A are formed longitudinal passages $e\ e'$, having branch passages $e^2\ e^3$ and $e^4\ e^5$, communicating, respectively, with the interior of the rings C C' and with annular chambers $f\ f'$, formed in the two-part sleeve D D'. Between the inner ends of the parts D D' of the sleeve or bush in which the axle A turns a space $d^2$ is left, in which engages a flange or collar $g$, formed on a packing-ring $h$, carried on the axle A. The said collar $g$ constitutes a partition separating the chambers $f\ f'$. Communicating with the chambers $f\ f'$ are tubes or passages $i\ i'$, contained within the portion G of the hollow frame of the machine connected to the bottom bracket E. The tubes or passages $i\ i'$ communicate at their other ends with a valve box or chamber $G^2$, preferably situated in the hollow frame of the machine, near the handle-bar. The valve box or chamber shown in the drawings is of cylindrical form and contains a hollow drum-shaped or cylindrical valve H, fitted to turn air-tightly in the chamber $G^2$. The interior of this valve H is divided by a diaphragm $h^2$ into two chambers $k\ k'$, which diaphragm may be formed in the valve itself, as shown in Fig. 8, or the valve may be made in parts screwed onto a diaphragm, as shown in Figs. 5 and 6. The ends of the cylindrical valve have each an opening $k^2\ k^3$, corresponding to openings $l\ l'$ in the ends of the valve box or chamber $G^2$, which latter openings communicate, respectively, by passages $m\ m'$ with the tubes or passages $i\ i'$, hereinbefore referred to.

The passages $m\ m'$ are preferably formed in the walls of the valve-box itself, as shown; but, if desired, they may be made separate from and connected to the valve-box. The chambers $k\ k'$ in the valve H are at all times in communication by the passages $l\ l'$, $m\ m'$, and $i\ i'$ with the interior of the annular tubes C C' in the hubs of the wheels B B'. In the cylindrical wall of the valve-box are openings $n\ n'$ and $o\ o'$, the former of which are open to the atmosphere and the latter communicate with a compressed-air reservoir, which is preferably the hollow frame of the vehicle. The valve H is provided in its side with openings $p\ p'\ q\ q'$, so arranged that when the valve is turned in one direction the openings $q\ p'$ in the valve coincide, respectively, with the openings $n'\ o$ in the valve-box, so that compressed air from the reservoir can pass into the chamber $k$ in the valve, and thence through the passages $l\ m\ i$ into the annular tube C in the hub of the wheel B, whereupon the said tube will be expanded and forcibly pressed against the interior surface of the hub of the said wheel, so as to cause the wheel to rotate with the axle A and impart motion through the chain to the wheels of the vehicle at a certain speed. When it is desired to speed by the use of the larger sprocket-wheel, the valve H is turned in the reverse direction by means of the handle I until the openings $p\ q'$ in the valve coincide, respectively, with the openings $o'\ n$ in the valve-box, whereupon communication between the compressed-air reservoir and the annular tube C will be cut off and communication established between the compressed-air reservoir and the annular tube C' in the hub of the chain-wheel B', so as to expand the said tube and cause the wheel B' to rotate with the axle A, while at the same time the compressed air from the annular tube C in the hub of the wheel B will escape into the atmosphere through the openings $q'$ and $n$, and so release the wheel B from the axle A, which will then rotate without rotating the said wheel.

The hollow frame of the velocipede may be charged with compressed air by any suitable means. For instance, the saddle may be connected to an air-pump attached to the machine so as to be operated by the up-and-down movement of the rider.

Having now particularly described and ascertained the nature of my said invention and in what manner the same is to be performed, I declare that what I claim is—

1. A velocipede having two differential sets of driving-gear, pneumatic clutches one for each gear, a compressed-air reservoir carried by the velocipede, a connecting-passage between each clutch and the reservoir, and a means in position to be operated by the rider and controlling the air-supply to and exhaust from both passages, substantially as described.

2. A velocipede provided with sets of differential driving-gear, pneumatic clutches intervening one between each set of driving-gear and the crank-shaft, a compressed-air reservoir carried by the velocipede, a connecting-passage between each clutch and the reservoir, a valve in position to be operated by the rider and simultaneously controlling said passages, substantially as described.

3. A velocipede having two driving wheels or sprockets of different sizes loosely mounted on the crank-shaft thereof, each wheel having in its hub an expansible hollow ring of flexible material acting when inflated to connect its sprocket with the crank-shaft, a receptacle for compressed air, a separate passage therefrom to each ring and supply and exhaust controlling devices operable by the rider for controlling the supply of compressed air from the reservoir to one of the hollow rings and its simultaneous exhaust from the other, substantially as described.

4. A velocipede having a source of compressed air two driving wheels or sprockets of different sizes loosely mounted on the crank-shaft and each having a recess in the hub thereof, tubular rings of flexible material fitting in said recesses and around the crank-shaft, independent tubes or passages leading through the frame of the machine and the crank-axle and connecting with the interior of the tubular rings, respectively, for conducting compressed air thereto, and a valve for alternately throwing said pipes and passages into communication with the source of compressed-air supply and with the atmosphere, whereby when the said valve is in one position one of said tubular rings will be in communication with the atmosphere and the other with the compressed-air supply, and when moved into another position said connections will be reversed, substantially as described.

In testimony whereof I have signed my name to this specification in the presence of two subscribing witnesses.

WILLIAM DE MORGAN.

Witnesses:
ENGLE STRANGE,
SPIRITO BERNARDI.